United States Patent
Yang et al.

(10) Patent No.: US 6,674,950 B2
(45) Date of Patent: Jan. 6, 2004

(54) OPTICAL WAVEGUIDE CROSSING AND METHOD OF MAKING SAME

(75) Inventors: Liyou Yang, Plainsboro, NJ (US); Nagandranath Maley, Exton, PA (US)

(73) Assignee: Sarnoff Corporation, Princeton, NJ (US)

(*) Notice: Subject to any disclaimer, the term of this patent is extended or adjusted under 35 U.S.C. 154(b) by 0 days.

(21) Appl. No.: 10/134,358

(22) Filed: Apr. 26, 2002

(65) Prior Publication Data

US 2002/0159739 A1 Oct. 31, 2002

Related U.S. Application Data

(60) Provisional application No. 60/287,277, filed on Apr. 27, 2001.

(51) Int. Cl.[7] .............................. G02B 6/10; G02B 6/12
(52) U.S. Cl. ......................................... 385/129; 385/14
(58) Field of Search ........................... 385/24, 129–132, 385/14

(56) References Cited

U.S. PATENT DOCUMENTS

| | | | | |
|---|---|---|---|---|
| 3,663,194 A | * | 5/1972 | Greenstein et al. | 65/43 |
| 4,120,588 A | * | 10/1978 | Chaum | 356/460 |
| 4,521,443 A | | 6/1985 | Naik et al. | |
| 4,695,122 A | | 9/1987 | Ishida et al. | |
| 5,636,298 A | * | 6/1997 | Jiang et al. | 385/14 |
| 6,108,464 A | * | 8/2000 | Foresi et al. | 385/14 |
| 2002/0097942 A1 | * | 7/2002 | Hamilton | 385/2 |

* cited by examiner

Primary Examiner—Phan T. H. Palmer
Assistant Examiner—Michell B. Connely-Cushwa
(74) Attorney, Agent, or Firm—William J. Burke

(57) ABSTRACT

A photonic device including: at least first and second optical waveguides; and, a buffer at least partially interposed between the first and second optical waveguides where they at least partially overlie one-another so as to at least partially mitigate interference between optical signals traversing the first and second optical waveguides.

32 Claims, 3 Drawing Sheets

US 6,674,950 B2

OPTICAL WAVEGUIDE CROSSING AND METHOD OF MAKING SAME

RELATED APPLICATION

This Application claims priority of U.S. patent application Ser. No. 60/287,277, filed Apr. 27, 2001, entitled DISC/RING RESONATOR IR DETECTOR FOR PHOTONIC COMMUNICATIONS, the entire disclosure of which is hereby incorporated by reference as if being set forth in its entirety herein.

FIELD OF INVENTION

The present invention relates generally to photonic devices and interconnections, and more particularly to optical waveguides, waveguide crossings and methods for making the same.

BACKGROUND OF THE INVENTION

Waveguide crossings are desirable for use in many photonic devices and Photonic Integrated Circuits (PICs) including III–V semiconductor photonic devices and waveguides, for example. Such circuits and devices may be monolithic in nature. One example of such a PIC or device may take the form of an optical crossconnect including a large number of channel counts wherein a large number of waveguide crossings may exist. Waveguide crossings in the same plane may cause significant loss and crosstalk, seriously limiting the performance of the devices and circuits, as is well understood by those possessing an ordinary skill in the pertinent arts.

Accordingly, it is highly desirable to provide for waveguide crossings that reduce the likelihood of losses and crosstalk resulting from them.

SUMMARY OF INVENTION

A photonic device including: at least first and second optical waveguides; and, a buffer at least partially interposed between the first and second optical waveguides where they at least partially overlie one-another so as to at least partially mitigate interference between optical signals traversing the first and second optical waveguides.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts and in which.

DETAILED DESCRIPTION OF THE PREFERRED EMBODIMENTS

Figure 1:
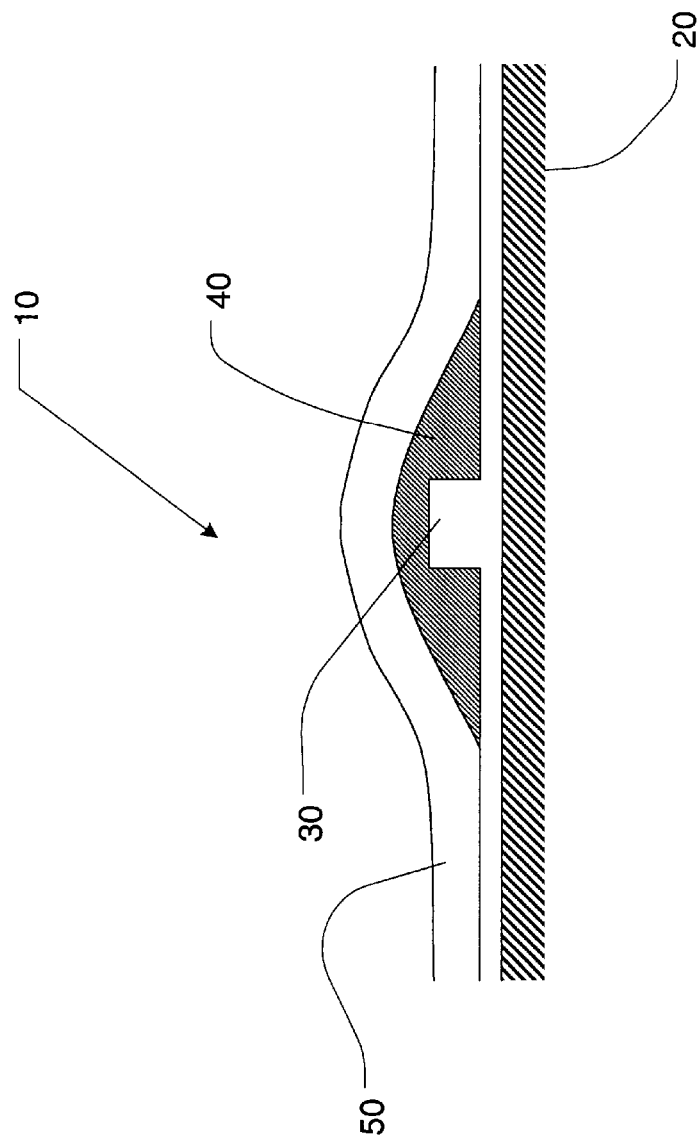
FIG. 1 illustrates a cross-section of an optical waveguide crossing structure according to an aspect of the present invention.

It is to be understood that the figures and descriptions of the present invention have been simplified to illustrate elements that are relevant for a clear understanding of the present invention, while eliminating, for purposes of clarity, many other elements found in typical optical devices, photonic devices, Photonic Integrated Circuits (PICs) and manufacture methods. Those of ordinary skill in the art will recognize that other elements are desirable and/or required in order to implement the present invention. However, because such elements are well known in the art, and because they do not facilitate a better understanding of the present invention, a discussion of such elements is not provided herein. The disclosure herein is directed to all such variations and modifications to such devices, PICs and methods known to those skilled in the art.

According to an aspect of the present invention, a three-dimensional (3-D) waveguide crossing may be achieved by forming a substantially smooth buffer layer over at least one waveguide, or set of waveguides, at one or more crossing points. The optical waveguides may include a core having a core refractive index. According to an aspect of the present invention, the buffer layer may include a material having a refractive index operatively lower than the core refractive index.

According to an aspect of the present invention, amorphous silicon (a-Si) materials, including a-Si:H and a-Si:F based alloys such as a-SiC$_x$ where 0<x<1, a-SiN$_y$ where 0<y<1.33, a-SiO$_z$ where 0<z<2 and a-SiGe$_w$ where 0<w<1, may be utilized to form the waveguides. The waveguides may be deposited using plasma enhanced chemical vapor deposition at a relatively low processing temperature, such as below approximately 300° C. or 250° C., as compared to epitaxial growth processes for type III–V semiconductor materials for example. Of course, other suitable materials and methods may also be used.

The buffer layer may be formed using a solution based material. The smooth shape of the buffer can be obtained by photolithography using a grey-scale mask, or actually through surface tension when the solution based material is deposited such as by ink-jet printing. Suitable materials for the buffer include, but are not limited to, standard planarization layer materials used in the IC industry, such as organosilane materials like polymethylsilsesquioxane and polyphenosilsesquioxane, and flowable oxides (FOX), to name a few. Further the buffer layer may take the form of a dielectric layer, using silicon oxide or silicon nitride for example. These materials may be deposited using a suitable technique, such as by plasma deposition, sputtering, spraying, inkjet printing or spin coating for example.

According to an aspect of the present invention, a first waveguide, or set of waveguides, may be formed using a plasma enhanced chemical vapor deposition process, for example. The buffer layer may then be formed over a portion of the first waveguide, or set of waveguides. A second waveguide, or second set of waveguides, may then be deposited over the buffer layer to form a waveguide crossing structure. This waveguide crossing structure may exhibit low loss, low crosstalk crossings of the waveguides.

Referring now to FIG. 1, there is shown a non-limiting cross-sectional diagram of a waveguide crossing structure 10 according to an aspect of the present invention. Generally, the waveguide crossing structure 10 includes: substrate 20, waveguide 30, buffer layer 40 and waveguide 50. While waveguides 30, 50 are illustrated to cross one-another at approximately right-angles, such is not necessary. The present invention is equally applicable to any situation where at least one waveguide at least partially overlies another, in a PIC for example.

Substrate 20 may form a base plane for the structure 10. Substrate 20 may take the form of any suitable material, such as silicon (c-Si) or any suitable conventional semiconductor substrate, such as InP, GaAs or GaN, for example.

The fabrication and operating characteristics of such substrates are well understood to those possessing an ordinary skill in the pertinent arts.

Waveguides 30, 50 may take any suitable form, such as a rib or ridge waveguide, and be formed of amorphous silicon (a-Si) material, including a-Si:H and a-Si:F based alloys thereof such as $a-SiC_x$ where $0<x<1$, $a-SiN_y$ where $0<y<1.33$, $a-SiO_z$ where $0<z<2$ and $a-SiGe_w$ where $0<w<1$. The operational characteristics of such materials are well understood to include good compatibility with III–V semiconductor materials, low loss and good physical conformability. Further, methods for forming such waveguides are well understood in the pertinent arts, and may include for example RF or DC assisted plasma enhanced chemical vapor deposition, photolithography and etching, for example.

Of course, other materials or methods recognized by those possessing an ordinary skill in the pertinent arts as exhibiting similar characteristics could of course be used as well.

Waveguides 30, 50 may take any suitable shape and dimension. For example, the waveguides 30, 50 may include substantially straight and/or curved portions.

Buffer layer 40 is at least partially interposed between waveguides 30, 50 where they at least partially overlie one-another, such as by crossing, so as to at least partially mitigate losses due to the superposition of waveguides 30,50, including interference, such as crosstalk, between optical signals traversing waveguides 30, 50. Of course, crosstalk generally refers to a disturbance caused by interference.

Buffer layer 40 may form a sufficiently smooth surface profile elevating from the base plane sufficiently gradual such that waveguide 50 is elevated above waveguide 30 where they at least partially overlie, or cross for example, and to at least partially mitigate loss of optical signals traversing waveguide 50 by reason of the elevation. According to an aspect of the present invention, the rate at which the buffer layer 40 expands (in approximate diameter) as compared to its progress in elevation from the base plane (the "aspect ratio") may be approximately 5:1 to approximately 100:1, inclusive.

Figure 3:
Figure 3:
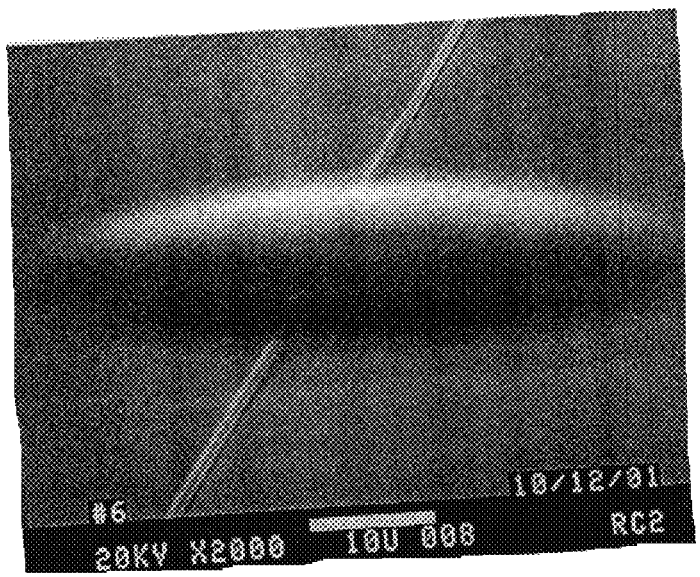

Referring now also to FIG. 3, there is shown a magnified perspective view of a waveguide (such as waveguide 30, FIG. 1) and buffer (such as buffer 40, FIG. 1) according to an aspect of the present invention. The buffer of FIG. 3 may be formed using spraying for example.

Referring again to FIG. 1, as set forth buffer layer 40 may be formed of organosilane materials like polymethylsilsesquioxane and polyphenosilsesquioxane, flowable oxides (FOX) or dielectric materials such as Silicon oxide and Silicon nitride, for example. According to an aspect of the present invention, due to the inherent characteristics of such materials, buffer layer 40 provides desirable shielding effects for the waveguides 30, 50 where they at least partially overlie, e.g., cross, thereby mitigating otherwise potentially deleterious loss and cross-talk effects as will be readily understood by those possessing an ordinary skill in the pertinent arts. Of course, other materials exhibiting analogous characteristics to such materials may also be used, provided of course they are analogously compatible with suitable processing methodologies used to form the waveguides 30,50, for example.

According to an aspect of the present invention, one or more waveguides 50 may be elevated above one or more waveguides 30 by a single buffer layer 40. That is, a plurality of waveguides 50 may be elevated so as to cross-over a single waveguide 30, or plurality of waveguides 30, by buffer 40. Or, a single waveguide 50 may be elevated so as to cross-over a single waveguide 30, or plurality of waveguides 30, by buffer 40.

Figure 2:
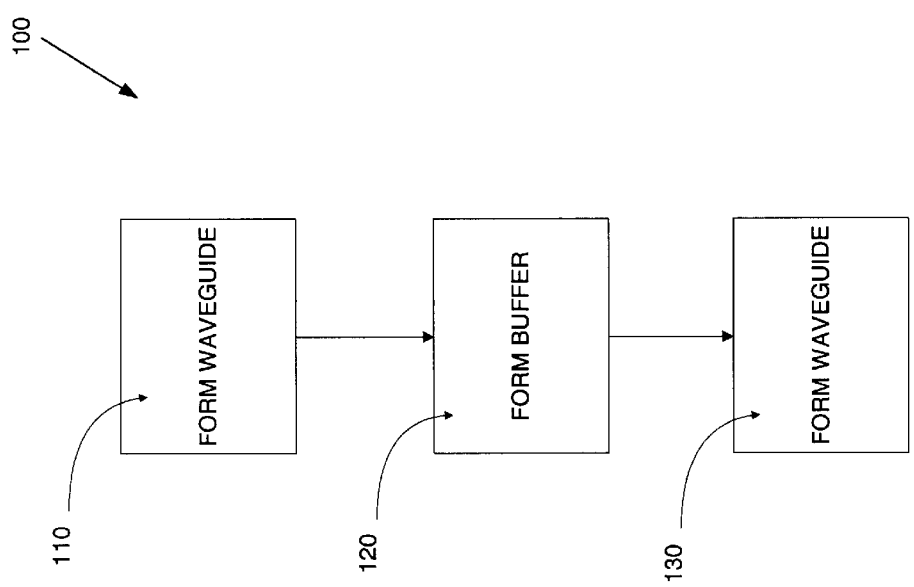
FIG. 2 illustrates a method being suitable for forming the waveguide crossing structure of FIG. 1; and, FIG. 3 illustrates a perspective view of a waveguide and buffer according to an aspect of the present invention.

Referring now also to FIG. 2, there is shown a method 100 being suitable forming the waveguide crossing structure 10 of FIG. 1. Method 100 generally includes forming 110 waveguide 30 on substrate 20; forming 120 buffer 40 over waveguide 30; and forming 130 waveguide 50 over buffer 40.

Waveguide 30 may be formed 110 using any conventional method known to those possessing an ordinary skill in the pertinent arts. Suitable methods may include conventional plasma enhanced chemical vapor deposition of a-Si material, for example. For example, waveguide 30 may take the form of an a-Si alloy material layer having a refractive index of approximately 3.4 deposited upon an a-Si alloy material under-cladding layer having a refractive index of approximately 3.2 in turn deposited on a c-Si wafer. The a-Si alloy undercladding layer may be approximately 1 $\mu$m thick, while the a-Si alloy core may be approximately 0.5 $\mu$m thick. An a-Si alloy material layer having a refractive index of approximately 3.2 may be provided as an overcladding layer, and have a thickness of approximately 1 while the substrate temperature is held at approximately 250° C. To form the a-Si alloy core layer, the $N_2$ to $SiH_4$ flow ratio may be approximately 0.45, while the substrate temperature is held at approximately 250° C. Processing pressure may be approximately 1.5 torr, while the 13.56-MHz RF power is held approximately at 50 W, for example.

Buffer layer 40 may be formed 120 over waveguide 30 prior to formation of waveguide 50, by inkjet printing of the buffer layer material, for example. Spraying of or spin coating of the buffer layer 40 material may also be used, optionally in conjunction with a subsequent patterning process to remove unwanted buffer layer 40 material, such as material not sufficiently adjacent to the crossing area to serve to elevate waveguide 50 where it at least partially overlaps waveguide 30, for example. Further, a layer of suitable buffer layer material, such as a dielectric material like Silicon oxide or Silicon nitride, may be deposited or spun over waveguide 30. This deposited layer of suitable material may be selectively removed, using a conventional graded index or grey-scale mask and etching for example, to form buffer 40 as will be readily understood by those possessing an ordinary skill in the pertinent arts.

Waveguide 50 may be formed 130 analogously to waveguide 30. Waveguides 30, 50 may be deposited at a relatively low processing temperature, such as below approximately 300° C. or 250° C., as compared to epitaxial growth processes for III–V semiconductor materials.

It will be apparent to those skilled in the art that various modifications and variations may be made in the apparatus and process of the present invention without departing from the spirit or scope of the invention. Thus, it is intended that the present invention cover the modification and variations of this invention provided they come within the scope of the appended claims and their equivalents.

What is claimed is:

1. A photonic device comprising:
    at least first and second optical waveguides; and,
    a buffer at least partially interposed between said first and second optical waveguides and forming a sufficiently smooth profile elevating said second of said optical waveguides with respect to said first of said optical waveguides where they at least partially overlie one-another so as to at least partially mitigate loss in optical signals traversing said second optical waveguide due to said elevation.

2. The method of claim 1, wherein said mitigated loss further comprises cross-talk between said optical signals traversing said second optical waveguide and at least one optical signal traversing said first optical waveguide.

3. The device of claim 1, further comprising:
   a plurality of additional optical waveguides; and,
   a plurality of buffers interposed between said plurality of additional optical waveguides where they at least partially overlie one-another;
   wherein said device forms an optical crossconnect.

4. The device of claim 1, wherein said waveguides comprise at least one amorphous silicon material.

5. The device of claim 4, wherein said amorphous silicon material comprises at least one material selected from the group consisting essentially of: a-Si:H and a-Si:F based alloys.

6. The device of claim 4, wherein said amorphous silicon material comprises at least one material selected from the group consisting essentially of hydrogenated or fluorinated: a-SiCx where 0<x<1, a-SiNy where 0<y<1.33, a-SiOz where 0<z<2 and a-SiGew where 0<w<1.

7. The device of claim 1, wherein:
   each of said optical waveguides comprises a core having a core refractive index; and,
   said buffer comprises a material having a refractive index operatively lower than said core refractive index.

8. The device of claim 1, wherein said buffer comprises at least one dielectric material.

9. The device of claim 1, wherein said buffer comprises at least one of silicon oxide and silicon nitride.

10. The device of claim 1, wherein said buffer comprises at least one organosilane material.

11. The device of claim 10, wherein said at least one organosilane material comprises at least one of polymethylsilsesquioxane and polyphenosilsesquioxane.

12. The device of claim 1, wherein said buffer comprises at least one flowable oxide.

13. The device of claim 1, wherein said waveguides comprise at least one amorphous silicon material, and said buffer comprises at least one organosilane material, flowable oxide or dielectric material.

14. A method for making a photonic integrated circuit, said method comprising:
   forming a first optical waveguide;
   forming a buffer over at least a portion of said first optical waveguide; and,
   forming a second optical waveguide over at least a portion of said buffer;
   wherein said buffer forms a sufficiently smooth profile elevating said second of said optical waveguides with respect to said first of said optical waveguides where they at least partially overlie one-another so as to at least partially mitigate interference between optical signals traversing said first and second optical waveguides.

15. The method of claim 14, wherein said forming said waveguides comprises using at least one amorphous silicon material.

16. The method of claim 15, wherein said amorphous silicon material comprises at least one material selected from the group consisting essentially of: a-Si:H and a-Si:F based alloys.

17. The device of claim 15, wherein said amorphous silicon material comprises at least one material selected from the group consisting essentially of hydrogenated or fluorinated: a-SiCx where 0<x<1, a-SiNy where 0<y<1.33, a-SiOz where 0<z<2 and a-SiGew where 0<w<1.

18. The method of claim 14, wherein each of said optical waveguides comprises a core having a core refractive index, and forming said buffer comprises using a material having a refractive index lower than said core refractive index.

19. The method of claim 18, wherein said forming said buffer further comprises using a grey scale mask to selectively remove a portion of said material having a refractive index lower than said core refractive index.

20. The method of claim 14, wherein said forming said buffer comprises utilizing a solution based material.

21. The method of claim 14, wherein said forming said buffer comprises utilizing at least one dielectric material.

22. The method of claim 14, wherein said forming said buffer comprises using at least one of Silicon nitride and Silicon oxide.

23. The method of claim 14, wherein said forming said buffer comprises using at least one organosilane material.

24. The method of claim 14, wherein said forming said buffer comprises using at least one of polymethylsilsesquioxane and polyphenosilsesquioxane.

25. The method of claim 14, wherein said forming said buffer comprises using at least one flowable oxide.

26. The method of claim 14, wherein said forming said buffer comprises forming a layer of dielectric material over said first waveguide and removing a portion of said deposited dielectric material using a grey scale mask.

27. The method of claim 26, wherein said forming said layer of dielectric material comprises at least one of spinning and depositing said dielectric material over said first optical waveguide.

28. The method of claim 14, wherein said forming said buffer comprises inkjet printing said buffer.

29. The method of claim 14 wherein said forming said buffer comprises spraying.

30. An optical communications device comprising:
   a plurality of optical waveguides crossing one another; and,
   a buffer positioned above at least one of said waveguides and forming a sufficiently smooth profile elevating at least one other of said waveguides over said at least one of said waveguides where they cross to at least partially mitigate losses in signals traversing said at least one and one other of said plurality of waveguides due to said crossing and losses in optical signals traversing said at least one other of said optical waveguide due to said elevation.

31. The device of claim 30, wherein said waveguides comprise at least one amorphous silicon material, and said buffer comprises at least one organosilane material, flowable oxide or dielectric material.

32. The device of claim 30, wherein said elevation is at a rate between approximately 1:5 and approximately 1:100.

* * * * *

UNITED STATES PATENT AND TRADEMARK OFFICE
CERTIFICATE OF CORRECTION

PATENT NO.    : 6,674,950 B2
DATED         : January 6, 2004
INVENTOR(S)   : Yang et al.

It is certified that error appears in the above-identified patent and that said Letters Patent is hereby corrected as shown below:

Drawings,
Please replace old Fig. 3 with the new drawing Fig. 3.

Signed and Sealed this

Fifth Day of October, 2004

JON W. DUDAS
*Director of the United States Patent and Trademark Office*